United States Patent [19]

Maeno

[11] 4,132,464

[45] Jan. 2, 1979

[54] LIQUID CRYSTAL DEVICE

[75] Inventor: Jun Maeno, Sekimachi, Japan

[73] Assignee: Hideki Ishii, Tokyo, Japan

[21] Appl. No.: 879,511

[22] Filed: Feb. 21, 1978

Related U.S. Application Data

[63] Continuation-in-part of Ser. No. 765,592, Feb. 4, 1977, abandoned.

[30] Foreign Application Priority Data

Feb. 6, 1976 [JP] Japan .................................. 51-11879

[51] Int. Cl.$^2$ ........................ G09K 3/34; G02F 1/13; G01K 11/16
[52] U.S. Cl. ............................... 350/351; 23/230 LC; 73/356; 250/429; 250/474; 252/299; 252/408; 428/1; 116/216
[58] Field of Search .............. 350/351; 73/356; 428/1; 252/299, 408; 23/230 LC; 250/429, 474; 116/114.5, 114 Y

[56] References Cited

U.S. PATENT DOCUMENTS

| | | | |
|---|---|---|---|
| 3,114,836 | 12/1963 | Fergason et al. | 252/408 |
| 3,410,999 | 11/1968 | Fergason et al. | 252/408 |
| 3,529,156 | 9/1970 | Fergason et al. | 252/408 |
| 3,594,126 | 7/1971 | Fergason et al. | 23/230 LC |
| 3,666,948 | 5/1972 | Mechlowitz et al. | 252/408 |
| 3,697,297 | 10/1972 | Churchill et al. | 73/356 |
| 3,733,485 | 5/1973 | Gaynor et al. | 350/351 |
| 3,796,884 | 3/1974 | Tricoire | 350/351 |
| 3,861,213 | 1/1975 | Parker | 73/356 |
| 3,936,817 | 2/1976 | Levy et al. | 350/351 |
| 3,980,300 | 9/1976 | Hornsby, Jr. | 428/1 |

FOREIGN PATENT DOCUMENTS

2704776  8/1977  Fed. Rep. of Germany ........... 252/299

OTHER PUBLICATIONS

Gray, G. W. et al., Liquid Crystals & Plastic Crystals, vol. 1, John Wiley & Sons, Inc., N.Y., pp. 175-198 (1974).
Brown, G. H. et al., Liquid Crystals, Gordon & Breach, Science Publishers, N.Y. pp. 147-174 (1967).

*Primary Examiner*—Benjamin R. Padgett
*Assistant Examiner*—T. S. Gron
*Attorney, Agent, or Firm*—Armstrong, Nikaido, Marmelstein & Kubovcik

[57] ABSTRACT

Provided is a liquid crystal device comprising a lyotropic-type cholesteric liquid crystal and an enclosure surrounding the liquid crystal, at least a part of which enclosure is transparent, so that the color of the liquid crystal, varying depending upon the change of temperature, is viewable therethrough. The liquid crystal is a concentrated solution having a concentration of approximately 50 to 85 wt.% of a cellulose derivative in water or an organic solvent. The cellulose derivative has an average polymerization degree of 30 to 600 and a chemical structure such that the —OH groups in the cellulose molecule are at least partially substituted with at least one radical of the following formula to the extent that the mole number (M.S.) of a hydroxyalkylating agent bonded with cellulose, per anhydro glucose unit of the cellulose molecule, is 2.0 to 10.0 at average:

$$-O+X-CHR_1-CHR_2-O\}_m H$$

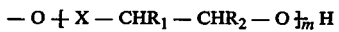

where X is direct bond or —CO—; and, when X is direct bond, $R_1$ is H or —CH$_3$, and $R_2$ is a radical selected from —CH$_3$, —C$_2$H$_5$, —CH$_2$A$_1$ (A$_1$ is a radical selected from -OH, halogen, —OCH$_3$ and —OC$_2$H$_5$) and —CHA$_2$—CH$_2$A$_3$ (each of A$_2$ and A$_3$ is selected from H, —OH and halogen or both A$_2$ and A$_3$ form a double bond together); and when X is —CO—, $R_1$ is H and $R_2$ is —CH$_3$; and m is an integer determined depending upon the M.S.

14 Claims, 2 Drawing Figures

LIQUID CRYSTAL DEVICE

This application is a continuation-in-part of application Ser. No. 765,592, filed Feb. 4, 1977, now abandoned.

BACKGROUND OF THE INVENTION

1. Field of the Invention

This invention relates to novel liquid crystal devices comprising a lyotropic-type cholesteric liquid crystal. The lyotropic-type cholesteric liquid crystal is a concentrated solution of a cellulose ether or ester, as specified below, in water or an organic solvent.

2. Description of the Prior Art

Liquid crystal devices comprising a lyotropic-type cholesteric liquid crystal are well known. Such devices are of a structure such that the liquid crystal is surrounded by an enclosure. At least a part of the enclosure is transparent, so that the color of the liquid crystal varies depending on the change of environmental conditions, such as temperature, types of electric fields and pressures, and the like. Most cholesteric liquid crystals used are esters of cholesteric compounds such as cholesteric derivatives, e.g. cholesteric carboxylates and carbonates of cholesteric alcohol. These liquid crystals are capable of selectively reflecting the incident light and of exhibiting color variation effects depending upon the change in environmental conditions such as temperature, types of electric fields and pressures. However, most of these liquid crystals are not stable against exposure to ultraviolet radiation and heat.

Lyotropic-type liquid crystals comprised of alkali salts of an aliphatic acid, anionic surfactant and high polymeric substances are also known. However, no liquid crystal devices comprising these materials have been heretofore proposed for use for color variation effects.

SUMMARY OF THE INVENTION

It now has been found that a concentrated solution of a cellulose ether or ester derivative, as specified below, in water or an organic solvent is capable of selectively reflecting incident light and exhibiting described color variation effects over almost the entire range of colors, namely colorless-violet-blue-green-yellow-red-colorless.

The liquid crystal contained in the liquid crystal device of the present invention is a concentrated solution having a concentration of 50 to 85% by weight, based on the weight of said liquid crystal, of a cellulose derivative in water or an organic solvent. The cellulose derivative has an average polymerization degree of 30 to 600 and a chemical structure such that the hydroxyl groups in the cellulose molecule are at least partially substituted with at least one radical, expressed by the following formula, to the extent that the mole number of a hydroxyalkylating agent bonded with cellulose, per anhydro glucose unit of the cellulose molecule, is 2.0 to 10.0 at average:

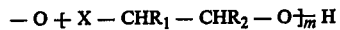

where X is direct bond or —CO—; and, when X is direct bond, $R_1$ is H or —$CH_3$, and $R_2$ is a radical selected from —$CH_3$, —$C_2H_5$, —$CH_2A_1$ ($A_1$ is a radical selected from —OH, halogen, —$OCH_3$ and —$OC_2H_5$) and —$CHA_2$—$CH_2A_3$ (each of $A_2$ and $A_3$ is selected from H, —OH and halogen or both $A_2$ and $A_3$ form a double bond together); and when X is —CO—, $R_1$ is H and $R_2$ is —$CH_3$; and m is an integer determined depending upon the M.S.

DETAILED DESCRIPTION OF THE INVENTION

Figure 1:
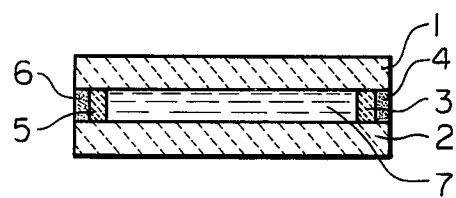
FIG. 1 illustrates a cross-sectional view of one example of the liquid crystal devices according to the invention.

The cellulose derivative used for the liquid crystal and having a chemical structure such that the hydroxyl groups in the cellulose molecule are at least partially substituted with the radical of the above-mentioned formula, includes, for example, those which are expressed by the following formulae.

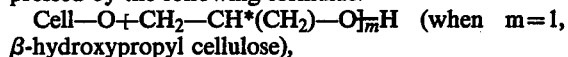 (when m=1, β-hydroxypropyl cellulose),

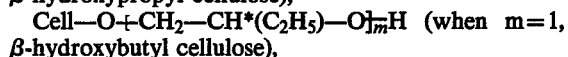 (when m=1, β-hydroxybutyl cellulose),

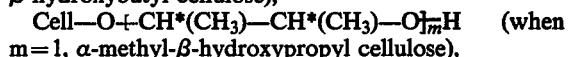 (when m=1, α-methyl-β-hydroxypropyl cellulose),

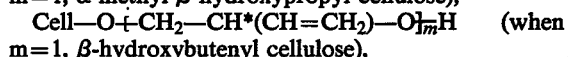 (when m=1, β-hydroxybutenyl cellulose),

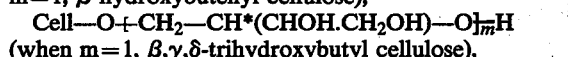 (when m=1, β,γ,δ-trihydroxybutyl cellulose),

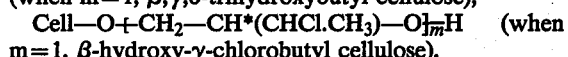 (when m=1, β-hydroxy-γ-chlorobutyl cellulose),

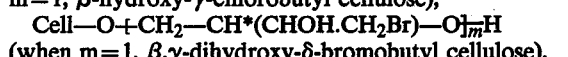 (when m=1, β,γ-dihydroxy-δ-bromobutyl cellulose),

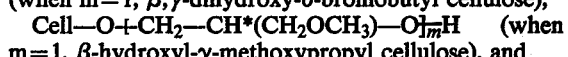 (when m=1, β-hydroxyl-γ-methoxypropyl cellulose), and

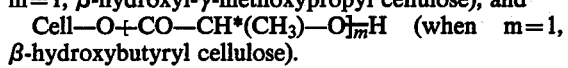 (when m=1, β-hydroxybutyryl cellulose).

By the asterisked carbon atoms in the above-listed chemical formulae are meant asymmetrical carbon atoms. As will be understood from the above list, the cellulose derivatives used in the liquid crystal element of the invention possess at least one asymmetrical carbon atom.

The cellulose derivatives used are known per se and prepared as follows. That is, β-hydroxypropyl cellulose, β-hydroxybutyl cellulose, α-methyl-β-hydroxypropyl cellulose, β-hydroxybutenyl cellulose, β-hydroxybutyryl cellulose and β-hydroxy-γ-methoxypropyl cellulose may be prepared by the addition reaction of an hydroxyalkylating agent such as propylene oxide, 1,2-butylene-oxide, 2,3-butylene-oxide, 3,4-epoxy-1-butene, β-butyrolactone and 3-methoxy-1,2-propylene oxide, respectively, to cellulose. The preparation procedures of these six cellulose derivatives are disclosed in, for example, Japanese Patent Publications Nos. 2199/1962, 10640/1967, 20200/1968, 4754/1970, 9398/1970 and 10354/1970, U.S. Pat. Nos. 2,455,083, and 2,985,501 and G. Montegudet, Compt Rend., 244, 2718(1957).

β,γ,δ-Trihydroxybutyl cellulose may be prepared by the addition reaction of hydroxyl groups to the unsaturated bonds of β-hydroxybutenyl cellulose by treating β-hydroxybutenyl cellulose with a diluted aqueous potassium permanganate solution. β-hydroxy-γ-chlorobutyl cellulose and β,γ-dihydroxy-δ-bromobutyl cellulose may be prepared by the addition reaction of hydrogen chloride and hypobromous acid, respectively, to the unsaturations of β-hydroxybutenyl cellulose. These procedures are disclosed in, for example, R. Q. Brewster et al, Organic Chemistry (1961), Prentice Hall Inc.

The cellulose derivative used in the invention possesses a chemical structure such that the hydroxyl groups in the cellulose molecule are at least partially substituted with at least one radical expressed by the above-mentioned formula. The degree of substitution should be such that the mole number of a hydroxyalkylating agent bonded with cellulose, per anhydro glucose unit of the cellulose molecule, is 2.0 to 10.0 at average, preferably 2.0 to 5.0, for the desired solubility in water or an organic solvent and the desired color variation effect. The degree of substitution expressed in terms of such mole number of a hydroxyalkylating agent is popularly called "M.S." for brevity, and determined, for example, by the Zeisel-Morgan method described in Industrial and Engineering Chemistry, Analytical Ed.(1946)18, P500, et seq., and by the end group methylation method described in Lenieux and Purves, Canadian Journal of Research (1974)25B, P485, et seq.

Each anhydro glucose unit in the cellulose molecule possesses three hydroxyl groups. When cellulose is treated with a hydroxyalkylating agent in an alkaline condition, the three hydroxyl groups are at least partially hydroxyalkylated. The mole number of a hydroxyalkylating agent bonded with cellulose, per anhydro glucose unit of the cellulose molecule, may be larger than 3.0 at average. This is because, when the hydroxyl groups of the cellulose molecule are hydroxyalkylated, the hydroxyalkyl groups so formed can be further hydroxyalkylated. Thus, long side chains can be formed in the cellulose molecule.

The letter "m" in the above-mentioned formula means an average length of such side chains and is determined depending upon the above-mentioned M.S. In other words, the letter "m" is defined as the ratio of M.S./D.S., where D.S. is the average number of the hydroxyl groups in the cellulose molecule per anhydro glucose unit, which hydroxyl groups have been substituted with an hydroxyalkylating agent. However, it is difficult exactly to determine D.S. and, hence, to determine the letter "m." Therefore, the cellulose derivative used in the present invention is conveniently named in this specification as the cellulose derivative with the letter "m" equal to 1, and the number of the M.S. of the cellulose derivative is parenthesised and referred to after the name of the cellulose derivative. For example, the cellulose derivative which has been prepared by introducing four moles of propylene oxide into the cellulose molecule per anhydro glucose unit is herein expressed conveniently as β-hydroxypropyl cellulose (M.S.=4). This cellulose derivative may also be expressed by the chemical formula Cell—O—(CH$_2$—CH(CH$_3$)—O)$_{\overline{m}}$H (M.S.=4).

The range of temperature within which the cellulose derivative liquid crystal of the invention changes its color greatly varies, mainly depending upon the particular cellulose derivative and solvent used. For example, 67% by weight solutions of β-hydroxypropyl cellulose, β-hydroxybutyl cellulose, α-methyl-β-hydroxypropyl cellulose, β-hydroxybutenyl cellulose and β-hydroxybutyryl cellulose (M.S.=2.8–3.5, average polymerization degree $\overline{D.P.}$ = approximately 175) exhibit color variation as shown in Table I, below.

Table I

| Cellulose derivative | M.S. | Water | Solvent Methanol | N,N-dimethyl-formamide |
|---|---|---|---|---|
| β-OH-propyl | 3.2 | 16 ~ 57° C | −40** ~ −7° C | −26 ~ 10° C |
| β-OH-butyl | 3.1 | 12 ~ 43° C* | −40** ~ −12° C | −31 ~ 3° C |
| α-Me-β-OH-propyl | 2.8 | 21 ~ 48° C* | −40** ~ 2° C | −22 ~ 15° C |
| β-OH-butenyl | 3.0 | 13 ~ 41° C* | −40** ~ −10° C | −21 ~ 7° C |
| β-OH-butyryl | 3.1 | 7 ~ 49° C | −40** ~ −18° C | −35 ~ −16° C |

Notes:
*At temperatures higher than these upper limits, the solutions become white and turbid.
**Observations not conducted at temperatures lower than −40° C.

Further, 75% by weight solutions of cellulose derivatives ($\overline{DP}$ = approximately 170–180) in methanol exhibit color variation in the temperature ranges shown in Table II, below.

Table II

| Cellulose derivative | M.S. | Temperature range (° C) Violet | Red |
|---|---|---|---|
| β-OH propyl | 3.2 | 7 | 52 |
| β-OH butyl | 3.1 | 2 | 46 |
| α-Me-β-OH propyl | 2.8 | 12 | 56 |
| β-OH butenyl | 3.0 | 4 | 49 |
| β,α,δ-tri-OH butyl | 3.0 | −11 | 28 |
| β-OH-αCl butyl | 3.0 | 1 | 43 |
| β,α-di-OH-δ-Br butyl | 3.0 | −6 | 31 |
| β-OH-α-OCH$_3$ propyl | 3.5 | 1 | 44 |
| β-OH butyryl | 3.1 | −3 | 39 |

The temperature range in which the cellulose derivative liquid crystal exhibits color change also varies depending upon the M.S. For example, 75% by weight solutions of β-hydroxypropyl cellulose (M.S.=2.4~4.6) in methanol exhibit color variations shown in Table III, below.

Table III

| M.S. | Temperature range (° C) |
|---|---|
| 2.6 | 4 ~ 48 |
| 3.2 | 7 ~ 52 |
| 4.3 | 11 ~ 55 |

The cellulose derivative used in the invention should preferably possess an average polymerization degree of approximately 30 to approximately 600. It has been found that, in general, the magnitude of the temperature range within which the cellulose derivative liquid crystal exhibits significant color variation is proportional to the degree of polymerization. When the degree of polymerization is lower than approximately 30, the magnitude of such temperature range is too small. In contrast, cellulose derivatives having the degree of polymerization higher than approximately 600 are poor in solubility in solvents.

For example, aqueous solutions of β-hydroxypropyl cellulose (M.S.=3.1~3.2) exhibited the temperature ranges of color variation shown in Table IV, below.

Table IV

| | β-hydroxypropyl cellulose | | | Temperature range (° C) |
|---|---|---|---|---|
| M.S. | Polymerization degree (DP) | Viscosity* (CPS) | Concentration (wt.%) | |
| 3.2 | 125 | 4.5 | 72 | 26 |
| 3.2 | 175 | 8.0 | 65 | 40 |
| 3.1 | 375 | 280 | 59 | 89 |

*As measured in an aqueous 2 wt.% solution at 20° C. It was found that β-hydroxypropyl cellulose [M.S.=3.0 and viscosity (aqueous 2 wt.% solution at 20° C)=800 cps] having an average polymerization degree of 600 exhibited a significant color variation in an aqueous solution of 56% by weight concentration.

It is presumed that the solvents which are capable of completely dissolving therein the cellulose derivatives can be used for the formation of the liquid crystal of the cellulose derivative. Water and most organic solvents have been found to be suitable. The organic solvents used include, for example, alcohols such as methanol, ethanol, 1-propanol, 2-propanol, 1-butanol, 2-butanol, iso-butyl alcohol, tert-butyl alcohol, 1,2-ethane-diol, 1,2-propane-diol, 1,3-propane-diol, 1,2-butane-diol, 1,3-butane-diol, 1,4-butane-diol, 2,3-butane-diol, 1,5-pentane-diol, cyclohexanol, 2-methoxyethanol, 2-ethoxyethanol, 2-isopropoxyethanol, 2-phenoxyethanol, tetrahydrofurfuryl alcohol, 1-methoxy-2-propanol, diacetone alcohol, and 2-chloroethanol and diethylene glycol; ethers such as 1,4-dioxane, tetrahydrofuran, tetrahydropyran and diethylene glycol monomethyl ether; ketones such as acetone, cyclohexanone and acetonylacetone; aliphatic acids such as formic acid, acetic acid, propionic acid, butyric acid, isobutyric acid and lactic acid; esters such as methyl formate, ethyl formate, methyl acetate, methyl lactate, γ-butyrolactone, monoacetin, diacetin and ethylene glycol monoacetate; nitrogen-containing compounds such as acetonitrile, formamide, N-methylformamide, N,N-dimethylformamide, N,N-diethylformamide, morpholine and N-methylpyrrolidone; sulfur-containing compounds such as dimethylsulfoxide, and; halogenated hydrocarbons such as chloroform and 1,2-dichloroethane. These organic solvents may be used alone or in combination.

Among the above-listed organic solvents, alcohols such as methanol, ethanol, 1-propanol, 2-propanol, 1,2-ethane-diol, 1,2-propane-diol, 1,3-propane-diol, 2-methoxyethanol and 2-chloroethanol; aliphatic acids such as formic acid and lactic acid; nitrogen-containing compounds such as formamide, N-methylformamide, N,N-dimethylformamide and N-methylpyrolidone, and; sulfur-containing compounds such as dimethylsulfoxide, are preferable because the cellulose derivative liquid crystals therefrom exhibit enhanced color variation effects. Water is also preferable because it is not injurious to health and because the liquid crystal therefrom exhibits enhanced color variation effects.

As hereinbefore, mentioned, the temperature range within which the cellulose derivative liquid crystal exhibits color variation depends upon the particular solvent used. For example, 66.7% by weight solutions of β-hydroxypropyl cellulose (MS=3.2, $\overline{DP}$=175) and β-hydroxybutyl cellulose (M.S.=3.1, $\overline{DP}$=175) vary in color over the range of from violet to red as shown in Table V, below.

Table V

| | β-OH propyl | | β-OH butyl | |
|---|---|---|---|---|
| | Temperature range (° C) | | Temperature range (° C) | |
| Solvent | Violet | Red | Violet | Red |
| Water | 16 | 57 | 11 | 42** |
| Methanol | −40* | −7 | −40* | −10 |
| Formic acid | −24 | 25 | −28 | 21 |
| N,N-dimethyl-formamide | −26 | 10 | −31 | 5 |
| Dimethyl-sulfoxide | 6 | 30 | 4 | 27 |

*Observations not conducted at temperature below −40° C.
**At temperatures higher than 42° C, the solution is white and turbid.

The concentration of the cellulose derivative in a solvent may be greatly varied depending upon the particular solvent used. The liquid crystal obtained from water may be practically used at a smaller concentration than the liquid crystals from organic solvents, and its minimum permissible concentration is approximately 50% by weight. Thus, the minimum permissible concentration of the liquid crystal of the invention is approximately 50% by weight. There is no clear maximum permissible concentration for the desired color variation effect, but it is advantageous that the liquid crystal has a concentration of below approximately 85% by weight in view of its fluidity and reversibility in color variation.

The temperature range within which the liquid crystal of the invention exhibits significant color variation also varies depending upon the concentration of the cellulose derivative. For example, aqueous solutions of β-hydroxypropyl cellulose (M.S.=3.2, $\overline{DP}$=175) exhibit the color variation shown in Table VI, below.

Table VI

| Concentration of β-OH-propyl cellulose in water (wt. %) | Temperature range (° C) | |
|---|---|---|
| | Violet | Red |
| 56 | −30** | 3 |
| 60 | 4 | 45 |
| 67 | 16 | 57 |
| 71 | 37 | 66* |

*At temperatures higher than 66° C, the solution is white and turbid.
**Supercooled state.

As is seen in Table IV, the temperature at which the cellulose derivative liquid crystal exhibits a certain color rises with an increase of the cellulose derivative concentration. This phenomenon can be similarly observed with organic solvents.

The liquid crystal device of the invention may have various structures, provided that the cellulose derivative crystal liquid is completely surrounded by an enclosure so that the solvent contained therein can not evaporate, and further, that at least a part of the enclosure is transparent so that the color of the liquid crystal varying depending upon the temperature is viewable therethrough.

The device shown in FIG. 1 is an example of planar laminated panels, which is formed by substrate sheets 1 and 2, spacers 3 and 4, seals 5 and 6, and the cellulose derivative crystal liquid 7. The substrate sheets and the spacers are made of, for example, glass, metal, ceramics or plastics. The use of the spacers can be omitted depending upon the type of the device. The seals are made of, for example, micro-crystalline wax, an epoxy resin, or solder, such as "Carasolzer" (trade name, supplied by Asahi Glass Co., Ltd.).

Figure 2:
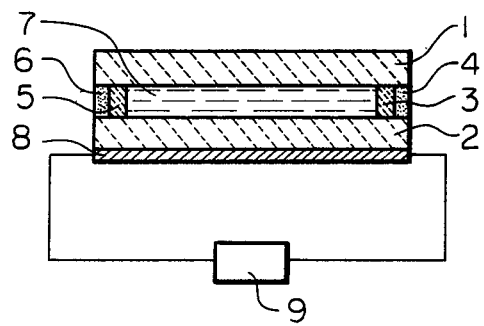
FIG. 2 illustrates a liquid crystal device combined with a circuit diagram of an automatic temperature controlling system.

The device shown in FIG. 2 comprises a liquid crystal device which is similar to that shown in FIG. 1, but is provided with a temperature controlling means comprised of a thermal element 8 and a current generating circuit 9 electrically connected to the thermal element 8. By providing the circuit 9 with an automatic controlling means, the temperature of the thermal element 8 and the color variation of the liquid crystal can be automatically controlled. The thermal element used may be made of an electrically conductive, heating resin film; a NESA film comprised of indium oxide or tin oxide; a thermoelectric element capable of being heated or cooled due to the Peltier effect, and; barium titanate semi-conductor ceramics.

A planar laminated liquid crystal device, which is a simple example of the device of the present invention, may be manufactured as follows. In a first method, a liquid crystal composition is sandwiched, if desired together with spacers, between substrate plates, and then, the sandwiched liquid crystal is sealed. In a second method, a solid film of the cellulose derivative is placed on a substrate plate having a spacer or spacers on the periphery of the substrate plate so that no air is incorporated between the substrate and the film; another substrate plate having small holes is placed on and adhered to the spacer or spacers; a predetermined amount of a solvent is forced through one of the holes of the substrate plate into the space between the substrate plate and the cellulose derivative film and; finally, the holes of the substrate plate are sealed. After a certain amount of time has passed the dissolution of the cellulose derivative is completed to form a liquid crystal of the desired concentration.

As a modification of the planar laminated liquid crystal device shown in FIGS. 1 and 2, liquid crystals of two cellulose derivatives different in degree of polymerization and/or chemical structures are sandwiched between two substrate plates in a manner such that the two liquid crystals are not mixed with each other. The modified planar laminated liquid crystal device exhibits two different colors, both of which vary depending upon the change in temperature. As another modification, two cellulose derivative solid films of desired shapes, e.g., letters, figures of designs, which are different in polymerization degree and/or chemical structures, are combined with each other and sandwiched between two substrate plates, and then, a solvent is forced into the space between the two substrate plates.

As a still further modification, a cellulose derivative solid film of a desired shape is sandwiched, together with a solution of another polymeric material such as polyvinyl alcohol, polyvinyl pyrolidone or methyl cellulose in a solvent capable of dissolving the cellulose derivative, between two substrate plates. The cellulose derivative solid film is gradually dissolved in the solvent to form a liquid crystal, but the cellulose derivative does not diffuse in the solution of the polymeric material. Thus, the shape of the film is maintained as it is.

In the planar laminated liquid crystal device having a thermal element attached thereto, the thermal element may be composed of many separate elements of small size, or alternatively, the planar laminated liquid crystal device may be composed of many separated devices of small size.

In stead of the thermal element closely stuck to the liquid crystal element as shown in FIG. 2, other heating means may be used such as an infrared heater, a carbon dioxide gas laser and a heated or cooled air blower.

The cellulose derivative liquid crystals used in the device of the invention are generally stable against exposure to ultraviolet radiation and heat, and neither injurious to health nor costly. The liquid crystal device of the invention can be used as a temperature indicator, a notice board, a signboard, a glass pane in furniture pane, window panes of houses or buildings, and a cover for an illuminator. The liquid crystal device may also be used as a portion of the wall of a transparent vessel, the temperature of the content in which can be visually recognized. Furthermore, the liquid crystal device of the invention can be used in a similar manner to the devices disclosed in U.S. Pat. Nos. 3,114,836; 3,410,997; 3,529,156; 3,666,948; 3,733,435; 3,796,884; 3,861,213; and; 3,936,817.

The following examples set forth some preferred embodiments of the liquid crystal elements. It should be understood that the examples are in no way limiting, but merely illustrative. In the examples, percent is by weight.

EXAMPLE 1

Glass strip spacers, having a thickness of 1 mm and a width of 3 mm, were adhered onto the peripheral portion on one surface of a glass plate substrate, of 1 mm in thickness, 10 cm in length and 10 cm in width, by using an epoxy binder.

A sheet of 0.7 mm in thickness, 9.4 cm in length and 9.4 cm in width, comprised of $\beta$-hydroxypropyl cellulose, having a M.S. of 3.2, a viscosity (2 wt.% aqueous solution at 20° C.) of 8.0 cps and an average polymerization degree of 175, as wetted with a 20% solution in methanol of $\beta$-hydroxypropyl cellulose similar to that mentioned above, and then, placed on the above-mentioned substrate so that no air bubbles were incorporated between the cellulose derivative sheet and the glass substrate. Another glass plate substrate having the same size as that mentioned above and two small holes on the portion close to the periphery was adhered onto the above-mentioned glass strip spacers by using an epoxy binder. Then, methanol was forced through one of the holes of the glass plate substrate into the space between the glass plate substrate and the cellulose derivative sheet until the space was filled therewith. Finally, the two holes of the glass plate substrate were sealed with an epoxy binder.

One week later it was found that the cellulose derivative and methanol were homogenized into a 76% solution. The liquid crystal so formed exhibited color variation from violet to red in the temperature range of from 6° C. to 52° C.

EXAMPLE 2

Glass strip spacers, of 0.8 mm in thickness, were adhered onto the peripheral portion on one surface of a glass plate substrate, of 1 mm in thickness, 12 cm in length and 7 cm in width, by using an epoxy binder to form a tray. The following two $\beta$-hydroxypropyl cellulose specimens A and B in a 70% aqueous solution form were placed in the tray so that one of the specimens occupied one half of the space within the tray and the other the residual half.

A. $\beta$-hydroxypropyl cellulose: M.S.=3.2, average polymerization degree=125, viscosity (2% aqueous solution at 20° C.)=4.5cps B. $\beta$-hydroxypropyl cellulose: M.S.=3.2, average polymerization degree=175, viscosity (2% aqueous solution at 20° C.)=8.0 cps Then, another glass plate substrate of the same size as that mentioned above was adhered onto the spacers of the tray by using an epoxy binder to form a liquid crystal device.

When the liquid crystal element was exposed to temperatures gradually varying from 12° C. to 42° C., the liquid crystal combination A/B exhibited the color variation of violet/colorless transparent green/purple; yellow/violet; orange/blue; red/green, and; finally, colorless, transparent/orange.

EXAMPLE 3

A 61% aqueous solution of β-hydroxypropyl cellulose, having a M.S. of 3.2, an average polymerization degree of 175 and a viscosity (as measured in 2% aqueous solution at 20° C.) of 8.0 cps, was sandwiched between two glass plate substrates, each of 100 cm in length, 100 cm in width and 5 mm in thickness, wherein ten glass beads each having a diameter of 0.8 mm were used as a spacer. The two glass plate substrates used were previously abraded at the peripheral portion of one surface of each substrate so that the abraded peripheral portion formed a plane inclined by 45 degrees relative to the surfaces of each substrate. When the β-hydroxypropyl cellulose solution was sandwiched between the two abraded glass plate substrates, a groove of a V-shaped section was formed on the periphery of the sandwiched assembly by the abraded portions.

The sandwiched assembly was pressed, whereby a liquid crystal layer of 0.8 mm in thickness was formed and the excessive amount of the liquid crystal overflowed into the V-shaped groove. The excessive amount of the liquid crystal in the groove was air-dried at 40° C. and, then, removed from the groove. Thereafter, micro-crystalline wax was filled in the groove at 85° C. to form a seal.

The planar liquid crystal device so obtained could be used, for example, for a window pane in houses and buildings. The window pane exhibited color variation depending upon the change of atmospheric temperature. The reflecting light and the transmitted light were visible in different colors, i.e. form complemental color. For example, the window pane looked light red indoors and deep green outdoors when viewed during the day, and looked green indoors and light red outdoors when viewed at night.

What is claimed is:

1. Liquid crystal device comprising a lyotropic-type cholesteric liquid crystal and an enclosure surrounding said liquid crystal, at least a part of which enclosure is transparent so that a color change of said liquid crystal is viewable, CHARACTERIZED IN THAT said liquid crystal is a concentrated solution having a concentration of approximately 50 to 85% by weight, based on the weight of said liquid crystal, of a cellulose derivative in water or an organic solvent; said cellulose derivative having an average polymerization degree of 30 to 600 and having a chemical structure such that the hydroxyl groups in the cellulose molecule are at least partially substituted with at least one radical, expressed by the following formula, to the extent that the mole number (M.S.) of a hydroxyalkylating agent bonded with cellulose, per anhydro glucose unit of the cellulose molecule is 2.0 to 10.0 at average,

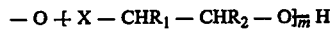

where X is direct bond or —CO—; and, when X is direct bond, $R_1$ is H or —CH$_3$, and $R_2$ is a radical selected from —CH$_3$, $C_2H_5$, —CH$_2$A$_1$ (A$_1$ is a radical selected from —OH, halogen, —OCH$_3$ and —OC$_2$H$_5$) and —CHA$_2$—CH$_2$A$_3$ (each of A$_2$ and A$_3$ is selected from H, —OH and halogen or both A$_2$ and A$_3$ form a double bond together); and when X is —CO—, R$_1$ is H and R$_2$ is —CH$_3$; and m is an integer determined depending upon the M.S.

2. Liquid crystal device according to claim 1 wherein said cellulose derivative is a β-hydroxypropyl cellulose (Cell—O{CH$_2$—CH(CH$_3$)—O}$_{\overline{m}}$H).

3. Liquid crystal device according to claim 1 wherein said cellulose derivative is β-hydroxybutyl cellulose (Cell—O{CH$_2$—CH(C$_2$H$_5$)—O}$_{\overline{m}}$H).

4. Liquid crystal device according to claim 1 wherein said cellulose derivative is α-methyl-β-hydroxypropyl cellulose (Cell—O{CH(CH$_3$)—CH(CH$_3$)—O}$_{\overline{m}}$H).

5. Liquid crystal device according to claim 1 wherein said cellulose derivative is β-hydroxybutenyl cellulose(-Cell—O{CH$_2$—CH(CH=CH$_2$)—O}$_{\overline{m}}$H).

6. Liquid crystal device according to claim 1 wherein said cellulose derivative is β, γ, δ-trihydroxybutyl cellulose (Cell—O{CH$_2$—CH(CHOH.CH$_2$OH)—O}$_{\overline{m}}$H).

7. Liquid crystal device according to claim 1 wherein said cellulose derivative is β-hydroxy-γ-chlorobutyl cellulose (Cell—O{CH$_2$—CH(CHCL.CH$_3$)—O}$_{\overline{m}}$H).

8. Liquid crystal device according to claim 1 wherein said cellulose derivative is β, γ-dihydroxy-δ-bromobutyl cellulose (Cell—O{CH$_2$—CH(CHOH.CH$_2$Br)—O}$_{\overline{m}}$H).

9. Liquid crystal device accoridng to claim 1 wherein said cellulose derivative is β-hydroxy-γ-methoxypropyl cellulose (Cell—O{CH$_2$—CH(CH$_2$OCH$_3$)—O}$_{\overline{m}}$H).

10. Liquid crystal device according to claim 1 wherein said cellulose derivative is β-hydroxybutyryl cellulose (Cell—O{CO—CH(CH$_3$)—O}$_{\overline{m}}$H).

11. Liquid crystal device according to claim 1 wherein said organic solvent is at least one solvent selected from the group consisting of methanol, ethanol, 1-propanol, 2-propanol, 1-butanol, 2-butanol, isobutyl alcohol, tert-butyl alcohol, 1,2-ethane-diol, 1,2-propane-diol, 1,3-propane-diol, 1,2-butane-diol, 1,3-butane-diol, 1,4-butane-diol, 2,3-butane-diol, 1,5-pentane-diol, cyclohexanol, 2-methoxyethanol, 2-ethoxyethanol, 2-isopropoxyethanol, 2-phenoxyethanol, tetrahydrofurfuryl alcohol, 1-methoxy-2-propanol, diacetone alcohol, 2-chloroethanol, 1,4-dioxane, tetrahydrofuran, tetrahydropyran, diethylene glycol monomethyl ether, acetone, cyclohexanone, acetonylacetone, formic acid, acetic acid, propionic acid, butyric acid, isobutyric acid, lactic acid, methyl formate, ethyl formate, methyl acetate, methyl lactate, γ-butyrolactone, monoacetin, diacetin, ethylene glycol monoacetate, acetonitrile, formamide, N-methylformamide, N,N-dimethylformamide, N,N-diethylformamide, morpholine, N-methylpyrolidone, dimethylsulfoxide, chloroform and 1,2-dichloroethane.

12. Liquid crystal device according to claim 1 wherein said organic solvent is at least one solvent selected from the group consisting of methanol, ethanol, 1-propanol, 2-propanol, 1,2-ethane-diol, 1,2-propane-diol, 1,3-propane-diol, 2-methoxyethanol, 2-chloroethanol, formic acid, lactic acid, fromamide, N-methylformamide, N,N-dimethylformamide, N-methylpyrolidone, and dimethylsulfoxide.

13. Liquid crystal device according to claim 1 wherein the liquid crystal is a 50 to 85% by weight solution of β-hydroxypropyl cellulose having an M.S. of 2.0 to 5.0 dissolved in water or methanol.

14. Liquid crystal device according to claim 1 wherein the M.S. is in the range of from 2.0 to 5.0.

* * * * *